(12) United States Patent
Castaneda

(10) Patent No.: US 8,251,221 B1
(45) Date of Patent: Aug. 28, 2012

(54) REUSABLE PROTECTIVE ENCLOSURE SYSTEM FOR AN OPEN-ENDED TUBULAR MEMBER

(76) Inventor: Aldo Francisco Castaneda, Mill Valley, CA (US)

(*) Notice: Subject to any disclaimer, the term of this patent is extended or adjusted under 35 U.S.C. 154(b) by 0 days.

(21) Appl. No.: 13/217,997

(22) Filed: Aug. 25, 2011

(51) Int. Cl.
*B65D 81/02* (2006.01)
*B65D 85/20* (2006.01)

(52) U.S. Cl. .......................... 206/592; 206/446; 206/523

(58) Field of Classification Search .................. 206/204, 206/446, 521, 523, 591, 592; 211/74
See application file for complete search history.

(56) References Cited

U.S. PATENT DOCUMENTS

| | | | | |
|---|---|---|---|---|
| 2,838,194 A * | 6/1958 | Piker | ............................. | 220/378 |
| 3,309,893 A * | 3/1967 | Heffler et al. | ................. | 206/523 |
| 3,531,644 A * | 9/1970 | Koster | ............................ | 206/523 |
| 3,621,994 A * | 11/1971 | Brown | ........................... | 206/446 |
| 4,240,547 A * | 12/1980 | Taylor | ............................ | 206/523 |
| 4,915,255 A * | 4/1990 | Curtis | ............................ | 206/521 |
| 4,942,966 A * | 7/1990 | Kemp | ............................. | 206/521 |
| 4,955,480 A * | 9/1990 | Sexton | ........................... | 206/446 |
| 5,024,865 A * | 6/1991 | Insley | ............................ | 206/204 |
| 5,029,699 A * | 7/1991 | Insley et al. | ..................... | 206/204 |
| 5,160,021 A * | 11/1992 | Sibley et al. | ................... | 206/204 |
| 5,184,721 A * | 2/1993 | Wengyn et al. | ............... | 206/443 |
| 5,219,504 A * | 6/1993 | Insley | ............................ | 264/116 |
| 5,303,822 A * | 4/1994 | Wengyn et al. | ............... | 206/443 |
| 5,375,716 A * | 12/1994 | Rubin et al. | ................... | 206/443 |
| 6,345,719 B1 * | 2/2002 | Jaycox | ............................ | 206/438 |
| 8,163,255 B1 * | 4/2012 | Rudolph | ........................... | 211/74 |

* cited by examiner

*Primary Examiner* — Bryon Gehman
(74) *Attorney, Agent, or Firm* — Patent Law Offices of Michael E. Woods; Michael E. Woods (57) ABSTRACT

An improved reusable protective enclosure system, comprising a protective housing (20) and cap member (12) for jars, bottles and similar receptacles of glass (50) or other fragile material. Its main object is the construction of a housing that renders a vial or jar contained therein resistant from breakage if the housing (20) is allowed to fall or suffers a sudden shock. Another object of the reusable protective enclosure system is the construction of an airtight enclosure (20), which is simple and inexpensive to manufacture. Other advantages of the invention are that the inner receptacle (50) be it made of glass or other fragile material, can be readily and repeatedly accessed, removed for sterilization or recycling and replaced for continued use.

1 Claim, 6 Drawing Sheets

REUSABLE PROTECTIVE ENCLOSURE SYSTEM FOR AN OPEN-ENDED TUBULAR MEMBER

BACKGROUND

This embodiment pertains to the general field of glass-lined enclosures and more particularly to a recyclable, reusable protective housing, which seals and protects an open-ended tubular member such as a glass vial or jar and the like.

PRIOR ART

One of the most effective means of storing and transporting substances is the use of glass-lined containers. Recently, though, plastic has become the preferred material for many products that, in the past, were exclusively manufactured from glass, such as medicine vials, jars and bottles. The reasons for the replacement of glass by plastic are primarily that plastic weighs less and is less expensive and is easier to produce. Along with additional safety factors, such as less chance of breakage, it is no surprise that plastic has almost completely replaced glass containers.

The main industries that continue to rely upon glass for containers are the medical and natural remedy industries. While plastic jars have replaced glass jars and bottles in some applications, there is still a need for glass. This is particularly true for the storage and transport of certain medicines and natural remedies, extracts, oils and tinctures, such as those that are susceptible to contamination or may leach into plastic containers.

A major problem exists in that plastic containers have been shown to cause contamination of the contents therein. An increasingly large population of people now prefer glass containers due to concerns over the risk of leaching from bisphenol A and phthalates, two additives used in plastic containers. Plastic containers also allow certain, usually organic compounds, medications to be absorbed into the plastic surface of the container itself, which may reduce potency of medications stored therein. Such contamination of a plastic containers also prevents the possibility of reuse or recycling of the container.

The only solution to many of these problems has been to continue storing and transporting medications and natural remedies in glass containers. Unfortunately, glass containers are considered desirable due to the risks associated with the chemicals contained in plastics and because of the risk that the container may break.

If there were some way to continue using glass containers for medications and natural remedies, with all of the safety characteristics of plastic, for the above reasons glass-based containers would be preferred in many situations. Such a glass container would offer the benefits of modern plastic containers such as an airtight seal, without risk of over or under-tightening; easy opening even for the elderly and disabled; with essentially effortless, resealing; and the container would be entirely re-usable and recyclable and free from the risk of chemical leaching. Such a container would also be shockproof to reduce the risk of breakage, while being aesthetically pleasing as well as simple and reliable yet inexpensive to fabricate.

A search on prior art did not disclose any patents that read directly on the claims of the instant invention, however the following U.S. patents are related:

| U.S. Pat. No. | Kind Code | Issue Date | Patentee |
|---|---|---|---|
| 5,695,090 | Not Listed | Dec. 9, 1997 | Burdick |
| 1,063,351 | Not Listed | Jun. 3, 1913 | Hyatt |
| 6,793,076 | B1 | Sep. 21, 2004 | Luo et al. |
| 5,699,922 | Not Listed | Dec. 23, 1997 | Harding |
| 4,746,017 | Not Listed | May 24, 1988 | Howard, et al |
| 4,300,612 | Not Listed | Nov. 17, 1981 | Schroeder, Jr. et al. |
| 3,982,716 | Not Listed | Sep. 28, 1976 | Trees |
| 3,604,584 | Not Listed | Sep. 14, 1971 | Shank, Jr. |

The U.S. Pat. No. 5,695,090 discloses a removable insulating container, which grips a bottle such that the container is held snugly in place. The container uses a separate lower sleeve and an upper cap, which are mounted on a medicine bottle to substantially encase the medicine bottle. The container is fabricated from a multi-layer flexible material, which has an impact resistant outer layer and an inner layer, which forms an internal channel that grips the side of the medicine bottle. The proximal end of the lower sleeve extends past the bottom of the bottle to prevent it from impacting a surface should it be dropped.

The U.S. Pat. No. 1,063,351 relates to protective casings or enclosures for bottles and similar receptacles of glass or other fragile material and has for its main object the construction of a casing in such a way as to make a bottle contained therein immune from breakage if the casing is allowed to fall. Another object of the invention is the construction of a casing, which is both simple and inexpensive to manufacture. A further object of the invention is the construction of a casing in which is formed grooves or pockets, which may be used for the carrying of any desired articles such as thermometers etc.

The U.S. Pat. No. 6,793,076 discloses a glass bottle protective housing designed to protect a glass bottle in the event the bottle is subjected to an impact shock. The enclosure is provided with a leak-proof seal and is particularly adapted for protecting glass bottles containing toxic injectable medication. The enclosure, which is preferably made from a transparent plastic, consists of a lower bottle container which includes a base and a plurality of shock absorbers, which are located to allow a bottle label to be clearly visible, on the base is located at least one sensor cavity into which is inserted an enclosure leakage sensor consisting of either a water soluble sensor or an electronic sensor. Both of which provide an indication if a bottle leakage occurs. To complete the enclosure the container includes a threaded bottle container cap, which includes a plurality of cap shock absorbers.

The U.S. Pat. No. 5,699,922 discloses a container closure system including a plurality of equally circumferentially distributed pins extending outwardly from a tubular neck of the container near the opening. A detachable cap consisting of nested inner and outer cap members. The inner cap member is dimensioned to receive the container neck and includes a plurality of sidewall openings for receiving the pings. The outer cap member has a plurality of licking wedges disposed on its inner surface. The inner and outer cap members are assembled so as to permit mutual rotation. Thus, when the cap is emplaced over the open end of the container, the pins are received in the openings to thereby inhibit mutual rotation between the inner cap member and the container, thus sealing the inner glass member and providing access to its contents via a safety cap easy for adults and young adults to open but difficult or impossible for children to open.

The U.S. Pat. No. 4,746,017 discloses a protective safety container for encasing toxic drug filled glass vials is disclosed. The container includes a molded plastic body that is shaped to conform to the shape of a vial to be protected. A plurality of spaced longitudinal ribs are formed on the inner surface of the container body that act to engage the vial and hold it firmly in position, and also form a cushioning air space between the vial and the container. A molded plastic annular base is adapted to be snap fitted into the body such that the vial cannot be easily removed once it is secured within the container. Disposed in the top of the container is a small aperture having a frangible disk disposed therein. The disk may be removed so that a hypodermic needle may be inserted into a stopper in the vial to withdraw the vial's contents. The aperture is too small, however, to permit removal of the stopper itself. All of these features combine to provide a protective container for a glass vial.

The U.S. Pat. No. 4,300,612 discloses a solvent and shatter resistant protector for glass bottles containing hazardous materials. The protector is comprised of opaque or transparent polymeric material and conforms substantially to the shape of the container that is protected. The container protector is made up of top and bottom portions, each having respective cooperating means, such as a special threading arrangement, for separable engagement, which enables engagement to be maintained even in the event of shocks that are sufficient to damage the protected glass container.

The U.S. Pat. No. 3,982,716 discloses a holder for temporarily supporting a bottle containing hypodermically injected medication. The holder is magnetically attached to a supporting surface, and securely supports the bottle so that both hands of the user are free to manipulate a syringe to withdraw the proper dosage from the bottle.

The U.S. Pat. No. 3,604,584 discloses a method for protecting glass articles, such as jars and drinks bottles from abrasion by heat shrinking a thermoplastic material around a portion of the glass article.

For background purposes and as indicative of the art to which the invention relates reference may be made to the remaining cited patents:

| U.S. Pat. No. | Kind Code  | Issue Date    | Patentee        |
|---------------|------------|---------------|-----------------|
| 2,480,247     | Not Listed | Aug. 30, 1949 | Jamison et al.  |
| 4,098,577     | Not Listed | Jul. 4, 1978  | Halpern         |
| 4,114,759     | Not Listed | Sep. 19, 1978 | Maloney, Jr.    |
| 4,813,541     | Not Listed | Mar. 21, 1989 | Velasco et al.  |
| 5,186,344     | Not Listed | Feb. 16, 1993 | Cook            |
| 5,860,550     | Not Listed | Jan. 19, 1999 | Miller et al.   |
| 6,112,579     | Not Listed | Sep. 5, 2000  | Tryba           |

SUMMARY

In accordance with one embodiment, a reusable protective enclosure system incorporates and protects an open-ended tubular glass member. The enclosure system comprises a protective housing, containing a bore of such diameter to receive the tubular glass member and a cap member, the cap member is securely attached over the opening of the protective housing. The cap member is secured to the protective enclosure by use of a plurality of magnets oriented circumferentially around the axis of the bore in both the protective housing and the cap member.

The reusable protective enclosure system in its basic design is comprised of:

a) a protective housing containing a bore of such diameter and depth as to receive the tubular glass member, a protective collar, and b) a cap member. The cap member incorporates a bore of such diameter to accommodate the protective collar that is incorporated into the protective housing top and the upper portion of the tubular glass member, and c) both the protective housing and the cap member, contain a plurality of permanently affixed magnets proximal to the openings of the bores in the cap member and protective housing, the magnets ensure that the contents of the tubular glass member are predictably enclosed within an airtight seal, and d) a means for protecting the tubular glass member from breakage via a shock absorber in the base of the protective housing and a pliable gasket embedded in the cap member.

The preferred means for achieving the objects of this invention include a protective housing containing a bore of such diameter and depth as to accommodate insertion and storage of a tubular glass member. At the mouth of the bore is a protective collar that protrudes from the top of the protective housing. When the tubular glass member is fully inserted into the bore in the protective housing, the open-end of the tubular glass member is slightly exposed above the protective collar before the cap member is attached. At the base of the bore in the protective housing is a concentric but substantially smaller diameter cylindrical recess. Seated within this cylindrical recess is a shock absorber, which protects the tubular glass member from breakage should the protective housing, cap member and tubular glass member be subjected to a shock. In addition, the shock absorber is mounted within the cylindrical recess to allow the tubular glass member, which rests upon it, to easily twist around its vertical axis when the cap member is attached and detached from the protective housing. The shock absorber also exerts upward pressure against the tubular glass member bottom when the cap member is attached, thus rendering a predictable and airtight seal between the gasket in the cap member and the tubular glass member. The protective housing also contains at least one pair of circumferentially oriented cavities. Such cavities are positioned axially from the center of said bore and are proximal to the protective collar. Each cavity contains a permanently affixed magnet.

The protective enclosure system also includes cap member. The cap member incorporates a bore of such diameter as to accommodate the protective collar in the protective housing when the cap member is attached to the protective housing. At the closed-end of the bore in the cap member, is a replaceable rubber gasket, which is held in place due to the fact that its diameter is slightly larger than the diameter of the bore in which it sits. The rubber gasket ensures that the contents of the glass member are under a predictable airtight seal when the cap member and protective housing are attached to one another. The rubber gasket also provides a degree of shock absorption to protect the tubular glass member should the enclosure system suffer a fall or sudden jolt. The body of the cap member also contains at least one pair of circumferentially oriented cavities. Each cavity contains a permanently affixed magnet. Each magnet is positioned axially from the center of the bore in the cap member. Each magnet is proximal to the bore's opening in the cap member.

With this configuration, when the cap member is coaxially aligned over the protective housing, a magnetic attraction pulls the protective housing and cap member tightly and securely together. The magnetic force creates a predictable airtight seal wherein the protective collar in the protective housing and the slightly exposed portion of the tubular glass member are forced into the rubber gasket within the cap member and vice versa. Simultaneously, the shock absorber at base of the protective housing exerts an upward force against the closed-end of the tubular glass member further ensuring an airtight seal wherein the open-end of the tubular glass member is forced into the gasket in the cap member.

When desired, the cap member and the protective housing can be separated and the airtight seal easily broken. The cap and housing are separated by holding the protective housing in one hand, while radially twisting the cap member with the other hand. This twisting action distances the plurality of magnets in the protective housing from the magnets in the cap member, allowing the cap member to be easily lifted up and away from the protective housing. Once the cap member and protective housing are separated, the contents of the tubular glass member are readily accessible. Separation of the cap member from the protective housing also allows for easy removal of the tubular glass member from within the protective housing. Once the cap and protective housing have been separated the tubular glass member can be removed, washed, sterilized and entirely replaced and recycled.

It is therefore a broad object of this invention to provide an improved reusable protective enclosure system for a tubular glass member.

It is another object of this invention to provide such an improved enclosure system, which is easy to open and close, yet which is sure in long lasting, repeat operation.

In another aspect, it is an object of this invention to offer such an improved enclosure system, which provides accurate, repeatable and airtight enclosure characteristics including the achievement of predetermined compressive forces applied to seal a glass member.

In yet another aspect, it is an object of this invention to provide such an improved enclosure system, which protects a glass member from breakage, and which glass member can be readily removed from its protective enclosure for sterilization or replacement to enable its continued reuse or recycling.

In yet another aspect, it is an object of this invention to provide an improved enclosure system, which can be made in an easily portable format, such that it comfortably fits in a pocket, purse, briefcase or handbag.

These and other objects and advantages of the present invention will become apparent from the subsequent detailed description of the preferred embodiment and the appended claims taken in conjunction with the accompanying drawings.

ADVANTAGES

Thus several advantages of one or more aspects of the reusable enclosure system for an open-ended tubular member are that it protects a tubular glass member from breakage when subjected to falls and abrupt shocks. Other advantages are that the glass member can be easily and repeated accessed and removed for sterilization, replacement and recycling. Furthermore, only the tubular glass member and the gasket within the cap member are intended to be replaceable, both the protective housing and cap member can be reused indefinitely thereby reducing cost and environmental waste. These and other advantages of one or more aspects of the protective enclosure system will become apparent from a consideration of the ensuing description and accompanying drawings.

BRIEF DESCRIPTION OF THE DRAWINGS

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

REFERENCE NUMBERS 12 cap member
14 cap member top
16 cap member bottom
20 protective housing
22 protective housing top
24 protective housing bottom
30 axis
32 bore
34 cavity
36 recess
38 protective collar
40 shock absorber
42 gasket
44 magnets
46 airtight seal
48 side wall cushioning
50 tubular glass member
52 tubular glass member open end
54 tubular glass member closed end

DETAILED DESCRIPTION

First Embodiment—FIGS. 1-6

Figure 1:
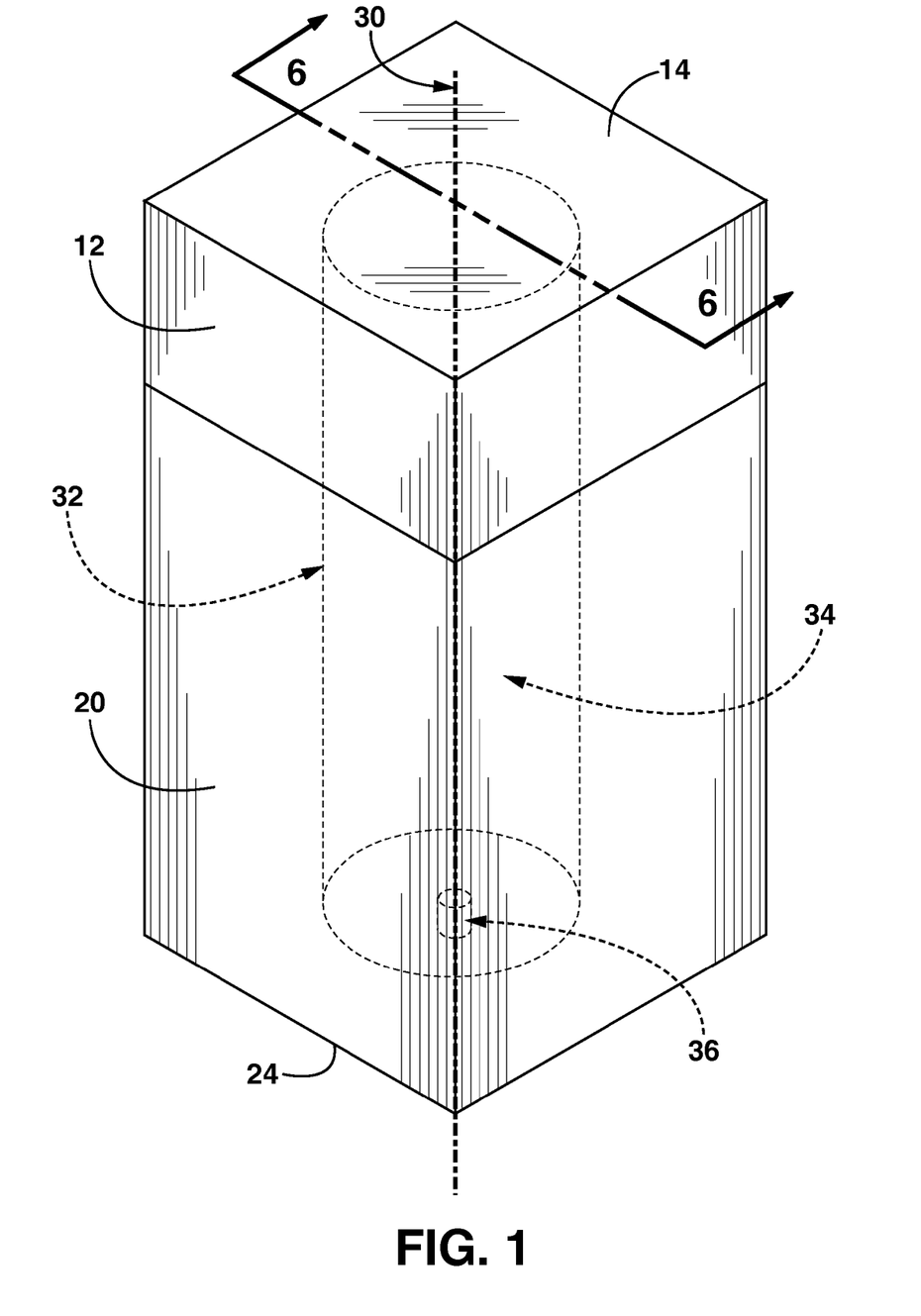
FIG. 1 is a perspective view of the reusable protective enclosure system for an open-ended tubular member.

FIG. 1 shows one embodiment of a reusable protective enclosure system for an open-ended tubular glass member. The reusable protective enclosure system incorporates a cap member 12. The cap member 12 has a bore 32 centered on an axis 30. The reusable protective enclosure system also incorporates a protective housing 20. The protective housing also incorporates a bore 32. The bore 32 in cap member 12 and the bore 32 in the protective housing 20 share a common axis 30 when attached to one another. The bore 32 in both the protective housing 20 and the cap member 12 together form a cavity 34 with a common axis 30. At the base of the bore 32 and proximal to the protective housing bottom 24 is a recess 36. The recess 36 is centered on axis 30. A sectional view of a reusable protective enclosure system for an open-ended tubular glass member is provided via FIG. 6.

Figure 2:
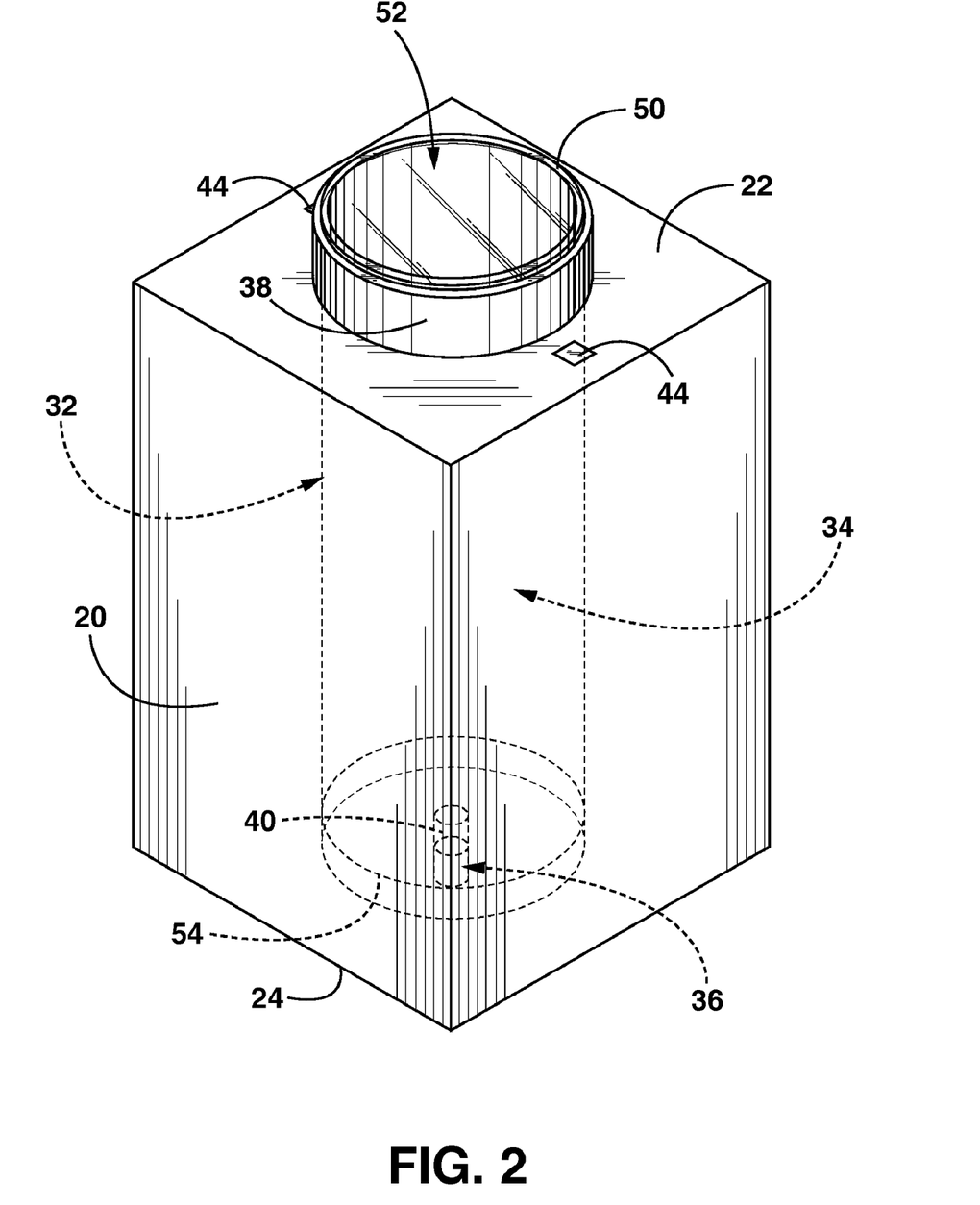
FIG. 2 is a perspective view of the protective housing for a tubular glass member.

FIG. 2 is a perspective view of the protective housing for a tubular glass member. A tubular glass member 50 is seated within the cavity 34 created by the bore 32 in the protective housing 20. The tubular glass member open end 52 is exposed slightly above the protective collar 38. Two magnets 44 are positioned axially and permanently embedded in the protective housing top 22. The tubular glass member closed end 54 rests on a shock absorber 40. The shock absorber 40 sits within the recess 36 in the protective housing bottom 24.

Figure 3:
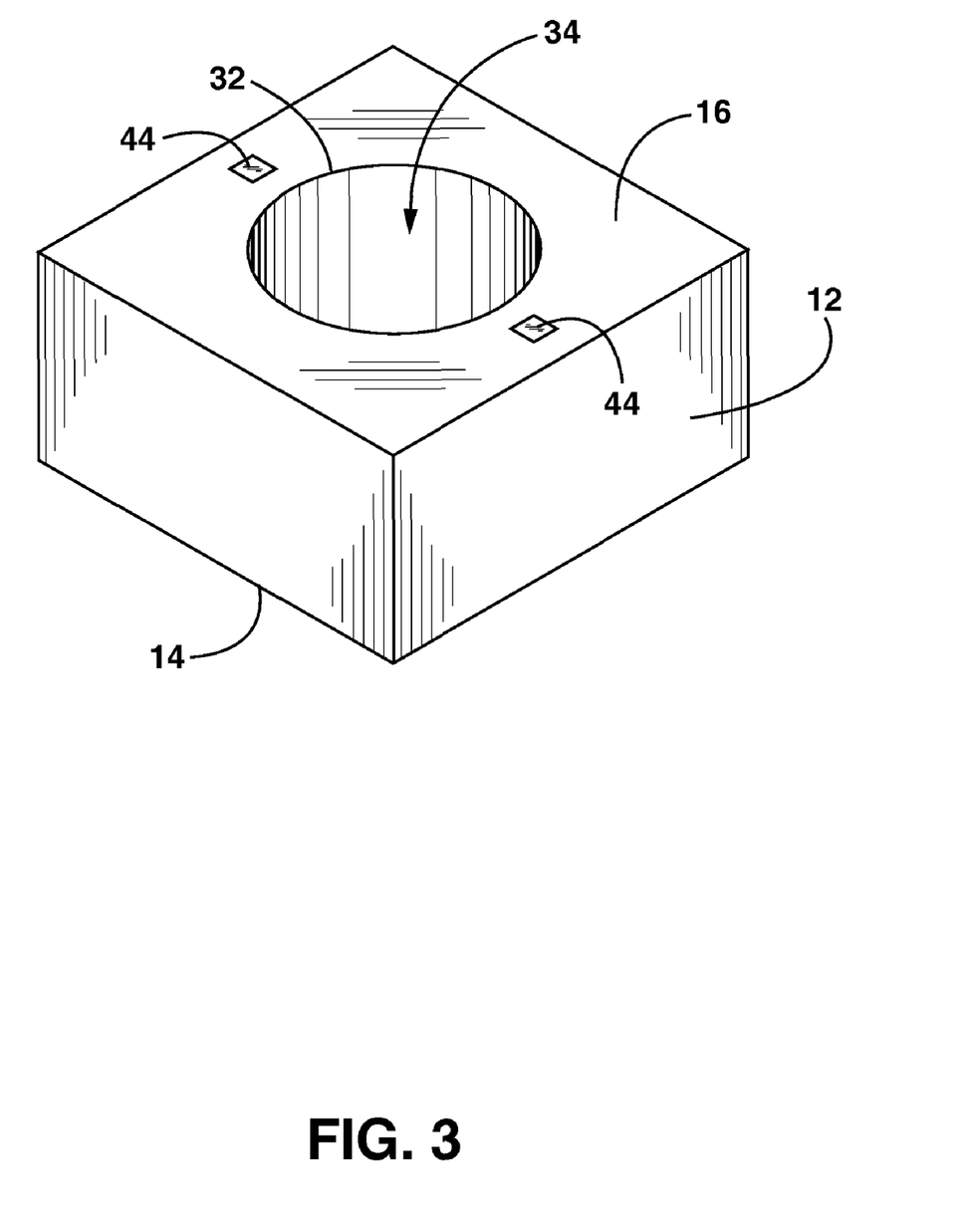
FIG. 3 is a perspective view of the cap member.

FIG. 3 is a perspective view of the cap member 12. The cap member 12 incorporates a bore 32, which extends into the cap member 12. The bore 32 in the cap member 12 creates a cavity 34, which extends toward, but does not pass through the cap member top 14. Two magnets 44 are positioned axially from the center of the bore 32 in the cap member bottom 16.

Figure 4:
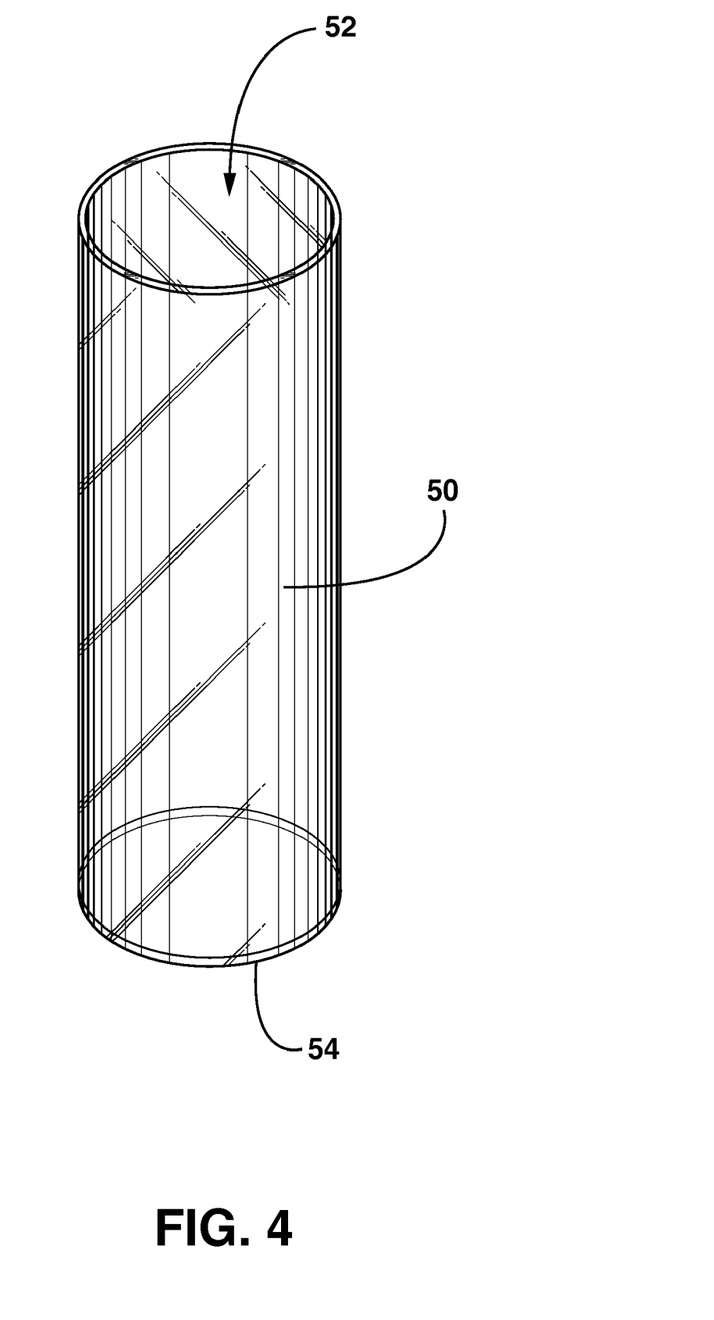
FIG. 4 is a perspective view of the tubular glass member.

FIG. 4 is a perspective view of the tubular glass member 50. The tubular glass member 50 incorporates a tubular glass member open end 52 and a tubular glass member closed end 54.

Figure 5:
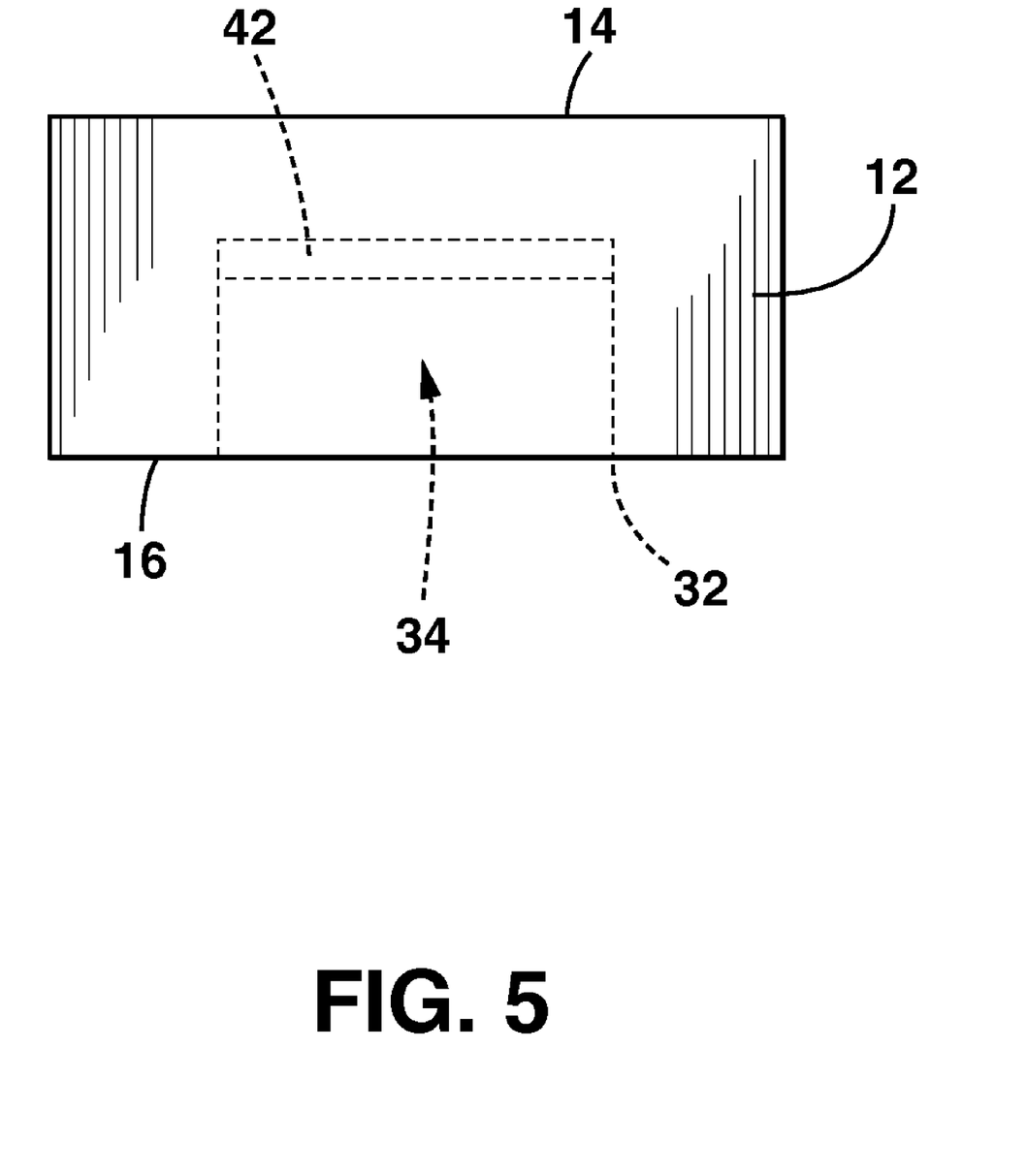
FIG. 5 is a side view of a cap member.

FIG. 5 is a side view of the cap member 12. The cap member 12 incorporates a cap member top 14. A bore 32 with an opening at the cap member bottom 16 creates a cavity 34 that extends toward but does not pierce the cap member top 14. A gasket 42 rests within the bore 32 proximal to the cap member top 14.

Figure 6:
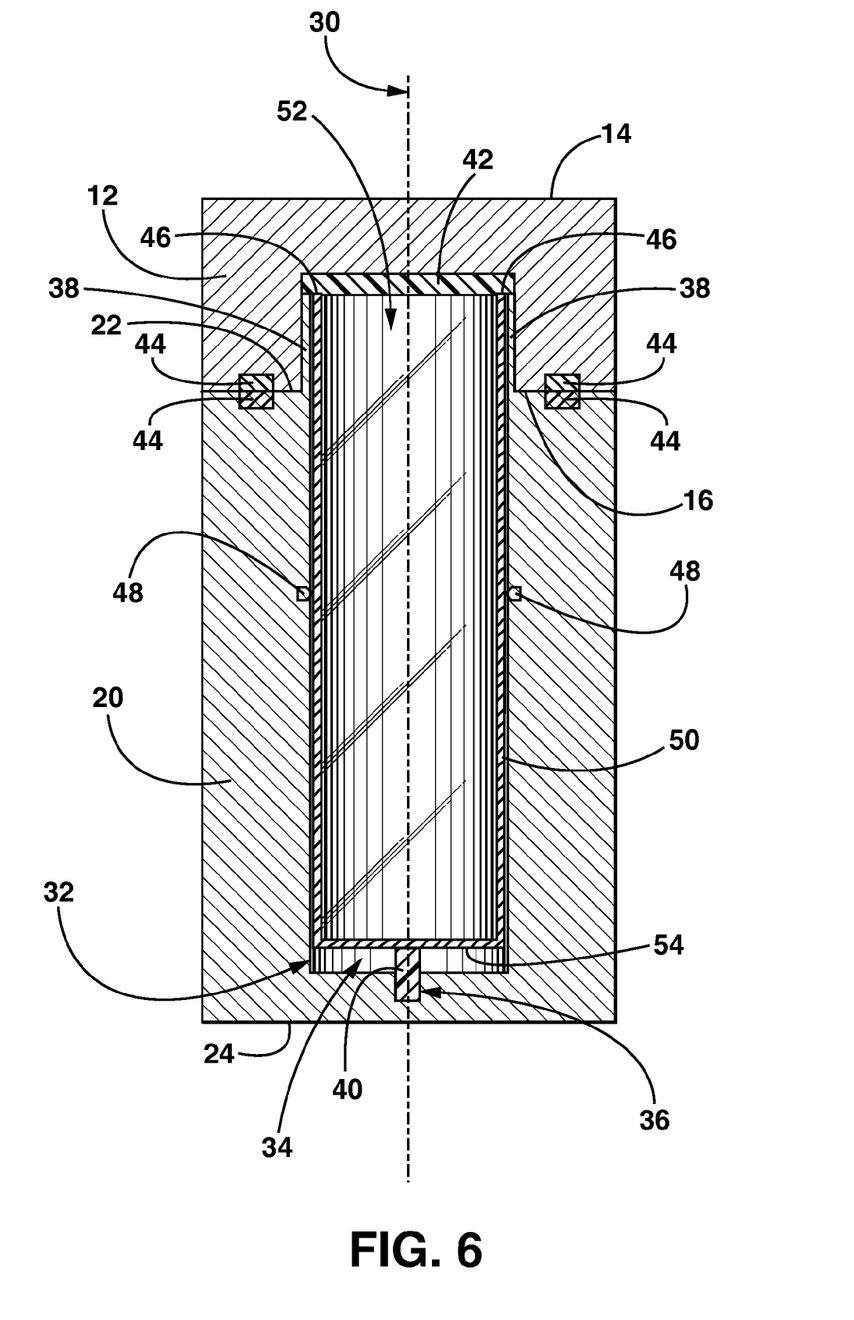
FIG. 6 is a section view taken from FIG. 1.

FIG. 6 is a sectional view taken from FIG. 1. Proximal to the protective housing bottom 24 is a recess 36 into which is inserted a shock absorber 40. The tubular member closed end 54 rests upon the shock absorber 40. The tubular glass member 50 occupies the cavity 34 within the protective housing 20 and the cap member 12. Sidewall cushioning 48 is positioned circumferentially within the protective housing 50 adjacent to and contacting the tubular glass member 50. Magnets 44 are embedded equidistant and radially from axis 30 in the protective housing top 22 and the cap member bottom 16. A predictable airtight seal 46 is formed where the gasket 42, protective collar 38 and glass member open end 52 intersect and are forced into contact by the magnets 44 in the protective housing 20 and the cap member 12.

Operation—FIGS. 2, 3, 4, 5, 6

To store and protect contents, such as cosmetics, medicines, natural remedies and essential oils within an airtight seal, one must first place these materials within the tubular glass member 50 (FIG. 4). Such contents may be placed within the tubular glass member 50 (FIG. 4) while it is free standing or when it sits in the protective housing 20 (FIG. 2). To seal and protect said contents within the tubular glass member 50, the tubular glass member 50 is inserted in the cavity 34 within the protective housing 20 (FIG. 2). Next one aligns the cap member 12 (FIG. 3) with the cap member bottom 16 over the protective housing top 22 (FIG. 2). When properly oriented, such that the magnets 44 in the cap member bottom 16 (FIG. 3) and magnets in the protective housing top 22 (FIG. 2) face one another, magnetic attraction will force the cap member bottom 16 and the protective housing top 22 into one another. By virtue of the attractive force exerted by the magnets 44 in the cap member 12 and protective housing 20 an airtight seal 46 (FIG. 6) is formed where the tubular glass member open end 52 and protective housing collar 38 and the gasket 42 within the cap member 12 intersect (FIG. 6). This airtight seal 46 is augmented by the upward force created by the shock absorber 40 (FIG. 6) pushing against the tubular glass member closed end 54, thus maintaining pressure between the tubular glass member and the gasket 42 (FIG. 6).

(FIG. 6) To access the contents stored under airtight seal 46 within the tubular glass member 50, one must grip the protective housing 20 with one hand and then radially twists the cap member 12 with the other hand. This twisting motion causes the cap member 12 to twist radially around the protective collar 38 causing the magnets 44 in the cap member bottom 16 to be distanced from the magnets 44 in the protective housing top 22, thus breaking their attractive bond. Once the magnetic force is released the cap member 12 can be easily removed from the protective housing 20. With the cap member 12 (FIG. 3) and protective housing 20 (FIG. 2) separated, the contents of the tubular glass member 50 (FIG. 2) are readily accessible. Now the tubular glass member 50 (FIG. 4) can be removed from the protective housing 20 (FIG. 2) for sterilization or recycling. If desired the gasket 42 (FIG. 5) can also be removed or replaced as needed.

Thus, the advantages of the protective housing include storing cosmetics, medicines, natural remedies and essential oils within a portable glass lined container, protected from shock and under an airtight seal. In addition, the glass lined container can is easily removed for cleaning, sterilization or recycling.

CONCLUSIONS, RAMIFICATIONS AND SCOPE

While the above description contains many specifications, these should not be construed as limitations as to the scope of the invention, but rather as an exemplification of one embodiment thereof. Many variations of the particular described embodiment are applicable and many other variations are possible. Some of these variations are presented in the following ramifications section.

MATERIAL VARIATION RAMIFICATIONS

A reusable protective enclosure system for an open-ended tubular member may be made from a wide variety of materials. For example the protective housing and cap member could be formed from a variety of plastic, metallic, ceramic, glass and rigid rubber materials.

VOLUMETRIC VARIATION RAMIFICATIONS

Reusable protective enclosure systems for an open-ended tubular member can be built in a wide range of sizes. The protective housing, cap member and tubular glass member could be formed to fit in a users pocket to store and transport relatively small volumes of material. In addition, protective enclosure systems could be made for use in the home, in larger sizes, to accommodate much greater volumes of cosmetics, medications, natural remedies, tinctures and oils.

MANUFACTURE VARIATION RAMIFICATIONS

Reusable protective enclosure systems for an open-ended tubular member can be manufactured using a variety of methods. The protective housing, cap member could be fabricated using highly automated assembly processes in large volumes, via injection molding of plastic or automated milling of metallic or ceramic substances. Alternatively, the protective housing and cap member could be hand crafted by artisans with hand tools, thus creating highly decorative and unique and artistic forms in which the tubular glass member could be enclosed.

CONFIGURATION VARIATION RAMIFICATIONS

A reusable protective enclosure systems for an open-ended tubular member can be built in a wide range of configurations. For example the sidewalls of the bore in the protective housing and cap member could incorporate embedded cushioning for additional shock protection to protect the tubular glass member. One or more o-rings or gaskets, seated within channels cut into the protective housing and cap member could provide additional shock protection for the glass member. Or a plurality of soft protrusions inserted into the sidewalls of the rigid protective member and the cap member could also offer additional shock absorption. In addition, the glass member could be sheathed in a soft protective sleeve, both of which would be inserted within the protective housing. In situations where a dry substance is stored within the enclosure system, the glass member, and any other elements within the bore could be removed entirely, for a simplified yet airtight and effective enclosure. And, the recess and shock absorber in the base of the protective housing could be replaced by a conical or multi-wave spring, which would simply be inserted in the base of the bore within the protective housing. In addition the cap member and protective housing may be attached and an airtight seal formed within the tubular member by means of threads in the cap member and protective housing.

Thus the scope should be determined by the appended claims and their legal equivalents, and not merely by the examples given.

What is claimed is:

1. A protective enclosure system for an open ended tubular member, comprising:
  A) a tubular member including a cavity, said tubular member having a first end, a second end opposite said first end, and an opening disposed in said first end accessing said cavity;
  B) a protective housing;
  1) said protective housing including:
    a) a bore in said protective housing of such diameter and depth as to accommodate insertion of said tubular member, said bore including a first axis;
    b) a protective collar, said protective collar is incorporated into said protective housing at the opening of said bore in said protective housing;
    c) a shock absorber inserted into the bottom of said bore; said shock absorber providing a protective spring upon which said tubular member rests when inserted into said bore; said shock absorber pivotally mounted within said bore;
  C) a cap member;
  1) said cap member, including;
    a) a bore of such diameter to completely accommodate insertion of said protective collar protruding from said protective housing, and also encompassing said first end of said tubular member, said bore including a second axis;
    b) a gasket within said cap member;
    c) means for securely coupling said cap member to said protective housing;
  whereby, when said cap member is coaxially placed over said protective housing by aligning said second axis with said first axis, a predictable airtight seal is obtained between said cap member and said protective housing; also said tubular member may be readily accessed, refilled and replaced by virtue of separating said cap member from said protective housing, thereby permitting direct access to said cavity of the tubular member or complete removal, sterilization and reuse or wholesale replacement of said tubular member.

* * * * *